United States Patent [19]

Klose et al.

[11] 4,379,255

[45] Apr. 5, 1983

[54] CONTROLLER WITH AT LEAST ONE SWITCH ACTUATABLE WITHIN A PREDETERMINED RANGE OF MOTION, IN COMBINATION WITH A SET POINT SELECTOR

[75] Inventors: Hans-Joachim Klose, Henstedt-Ulzburg; Udo-Frank Hellmig, Pinneberg, both of Fed. Rep. of Germany

[73] Assignee: Jungheinrich Unternehmensverwaltung KG, Hamburg, Fed. Rep. of Germany

[21] Appl. No.: 221,630

[22] Filed: Dec. 31, 1980

Related U.S. Application Data

[63] Continuation of Ser. No. 937,129, Aug. 28, 1978, abandoned.

[30] Foreign Application Priority Data

Sep. 2, 1977 [DE] Fed. Rep. of Germany ....... 2739538

[51] Int. Cl.³ .............................................. H02P 5/16
[52] U.S. Cl. ............................ 318/313; 250/231 SE; 250/561
[58] Field of Search ............... 318/139, 313, 640, 264; 250/561, 231 SE

[56] References Cited

U.S. PATENT DOCUMENTS

| | | | |
|---|---|---|---|
| 3,767,992 | 10/1973 | Edwards et al. | 318/640 |
| 3,808,485 | 4/1974 | Sakai et al. | 318/313 |
| 3,818,199 | 6/1974 | Jones | 318/587 |
| 4,028,597 | 6/1977 | Dalaney et al. | 318/139 |
| 4,057,752 | 11/1977 | Artrip et al. | 318/139 |
| 4,066,939 | 1/1978 | Joyes | 318/599 |
| 4,105,938 | 8/1978 | Mathews, Jr. | 318/599 |

*Primary Examiner*—David Smith, Jr.
*Attorney, Agent, or Firm*—Toren, McGeady and Stanger

[57] ABSTRACT

A controller with at least one switch or a plurality of switches e.g. in the form of a power switchgroup for controlling an electric drive motor in a vehicle wherein a set point selector consists of a mask that is rigidly connected or interchangeably attached to an actuating member of the controller, the mask is adapted to provide a predetermined set point characteristic in cooperation with control elements that are connected to an input of an electronic circuit which includes a second input to which are connected means for varying a reference voltage at the output of the electronic circuit and the control range of the set point characteristic. The control elements cooperating with the mask may consist of an opto-electronic transmitter-receiver device.

10 Claims, 5 Drawing Figures

CONTROLLER WITH AT LEAST ONE SWITCH ACTUATABLE WITHIN A PREDETERMINED RANGE OF MOTION, IN COMBINATION WITH A SET POINT SELECTOR

This is a continuation of application Ser. No. 937,129 filed Aug. 28, 1978 now abandoned.

The present invention relates to a controller which includes at least one switch that is actuatable within a predetermined range of motion, in combination with a set point selector in the form of an electronic circuit.

Rotary controllers for controlling a traveling drive are already known. A rotary controller may for example have the form of a cam-operated switch, travels switches or switch groups for performing certain switch-on functions in dependence upon the rotary position. It is known to provide a set point selector in the form of a potentiometer for such switches. The rotary range provided, however, includes, in a tandem arrangement, portions for forward and reverse travel. The set point selector is, therefore, of a relatively complicated design. It is rather complicated to provide similar characteristics for forward and reverse travels. The heretofore known set point selector is subject to wear and, furthermore, it is rather difficult or hardly possible to obtain an exact matching with the other switching functions, i.e. to exactly synchronize the set point selector.

The present invention relates generally to a controller, and in a preferred application to a rotary controller for electric vehicles whereby a particularly advantageous embodiment thereof is a power switchgroup but there may likewise be contemplated other controls by a set point selector such as in industrial warehouse vehicles the control of a hoisting movement, of slow-speed travel or the like with special motion characteristics. In vehicles of this type is known a pulse control for the traveling drive, and this control is likewise included.

The above indicated known arrangement has the further drawback that it is very expensive to accommodate several set point selectors, and likewise the arrangement of only a single set point selector for the generation of predetermined characteristics that are precisely related to further switching functions of the controller faces difficulties.

It is an object of the present invention to provide a novel and improved controller.

It is another object of the present invention to provide a controller of the general type indicated above by which controller may be generated, in dependence upon a controller movement, a set point characteristic which will likewise be effective in a precise relationship in reverse controller movements, and which furthermore allows, in given controller positions, control range variations, e.g. when reversing the direction of travel.

As set point selector there is advantageously arranged at least one mask with a predetermined characteristic at the actuating member of the controller and by the motion of the actuating member movable between an electronic transmitting and receiving device which generates a set point corresponding to the characteristic by means of a connected electronic circuit. The combination of the mask with the actuating member for further switches of the controller provides the advantage that error-introducing transfer members are not required, and especially there is provided, in every switching operation, an adequate control influence via the electronic transmitting and receiving device.

The switches of the controller may consist of cam-operated mechanical switches but likewise of any other types of switches such as e.g. electronic types.

The electronic transmitting and receiving device may operate opto-electronically or also by inductance. The mask and the transmitting and receiving device are of a corresponding design. Electronic transmitting and receiving devices of this type in combination with a movable mask therebetween are known per se.

The reference to an actuating member also includes a lever which may be e.g. in the form of a pivot lever and with which are associated the other switches in a cam track. The mask would then be at the lever in the direction of motion of the lever.

It is preferred, however, that the controller is in the form of a rotary switch in which the actuating member is in the form of a pivot axis, and that the mask characteristic is arranged substantially concentrically of the pivot axis and extends through an angle corresponding to the rotary range of the controller.

This embodiment has the advantage that for the corresponding rotary motion of the axis it is possible to design the mask correspondingly. Thereby it is preferred that in the mask is provided within the path intended for the control of the set point point, at least a control mask or control edge extending concentrically of the pivot axis and through an angle concentrically of the pivot axis which angle is substantially dependent upon the switch actuating members of the controller and wherein the mask or edge has a profiling that varies along the length thereof.

Suitably, there is provided an opto-electric transmitting and receiving device, and the mask includes at least one controlling edge with a predetermined characteristic along its length.

According to another advantageous embodiment, the controlling edge may be part of a controlling slot having a width that varies along the length of the slot.

This provides an assembly having considerable advantages. Thereby it must be considered that the controller may e.g. constitute a link between the drive pedal of a fork-lift vehicle and a pulse control for converting a foot movement of the fork-lift vehicle driver-operator into an electrical signal for the pulse control which in turn brings a drive motor to a corresponding speed. The set point selector of the switchgroup is not subject to wear and in accordance with the invention designed so that by simple expedients the switchgroup may provide a control characteristic that is readily adapted to any type of vehicle or respectively to a predetermined control function.

The above stated object is thereby achieved by the fact that the electronic circuit includes an additional input by which is variable the reference voltage for the output of the electronic circuit and the control range for the set point, in retaining the characteristic.

By this may be selected set point ranges or effected reversals for which the operator is provided with an enhanced safety "feel" since at the moment of reversal the actuating member or respectively the pivot axis remains in the same position and an absolute proportionality is preserved so that there will be maintained a direct relationship to the controlled apparatus. This increases the safety.

In combination with a switchgroup for providing the energization of the traveling drive and the speed control by means of the mask, the combination of a travel direction switch with the additional input achieves that when reversing the direction of travel in the sense of braking there will be varied, particularly reduced, an input voltage for the electronic circuit that is associated with the switchgroup. Any change in controller position, i.e. for example any change in the position of the drive pedal leads proportionally to a corresponding speed variation of the vehicle. Advantageously, the switchgroup allows to control the intensity of the electronic braking which is dependent upon the position of the switchgroup, particularly of the position of a drive pedal. Reversal of traveling direction will then entrain reverse travel within the range of the same set point characteristic.

With respect to the above mentioned known arrangement with a potentiometer, this provides the additional advantage that for forward and reverse travels the control may be effected within the same adjustment or respectively rotary range of the controller. The further advantage resides in the fact that thereby may be accommodated a longer controlling edge or mask than in the known arrangement in which are required, in series, various adjustment or rotary ranges for the various control ranges.

With particular advantage a variable potentiometer may be provided at the additional input of the electronic circuit and a switch may be connected mechanically or electronically in parallel to this potentiometer and adapted for commutation, for varying the reference voltage. This switch may for example to opened in dependence upon the position of the travel direction switch.

A particularly advantageous embodiment in an arrangement in an electric vehicle provides that to the electronic circuit may be connected a control drive, a traveling drive or a hoisting drive, and a switch arranged at the additional second input may be provided in combination with a travel direction switch or as a slow-speed travel switch. Suitably, a pedal is arranged at the actuating member of the switchgroup.

The invention advantageously provides a switchgroup as rotary controller in which the characteristic of the signal generated without any contacts by the mask is introduced into the connected electronics, in dependence upon the movement of e.g. a pedal. In this context, there is likewise brought about, in dependence upon the actuation of the travel direction switch, a reversal, in varying a reference value at the additional input of the electronic circuit. The advantageous interchangeable arrangement of masks with different characteristics at the actuating member, particularly the pivot axis, renders the switchgroup so as to be readily adaptable.

The invention likewise provides a very sturdy embodiment by the fact that on the housing of the rotary controller is eccentrically arranged an extension with an engagement slot extending in a plane perpendicularly of the pivot axis of the rotary controller, and that within the housing portion are provided a light emitter on one side of the engagement slot, and a light receiver on the other side of the engagement slot, the circuit of which is connected to the electronic circuit, and that the mask is movable within this engagement slot. This encapsulated controller with the described housing may be mounted in various types of vehicles, may be separately commercialized and may be utilized for the most varied purposes, in making use of the inventive advantages. This controller particularly in the form of a switchgroup may include several switch planes and likewise sveral masks in combination with respectively associated electronic transmitting and receiving devices.

In the following, the present invention will be described more in detail with reference to embodiments shown in the appended drawings wherein FIG. 1 is a partly sectional lateral elevational view of a rotary controller in accordance with the present invention;

Figure 1:
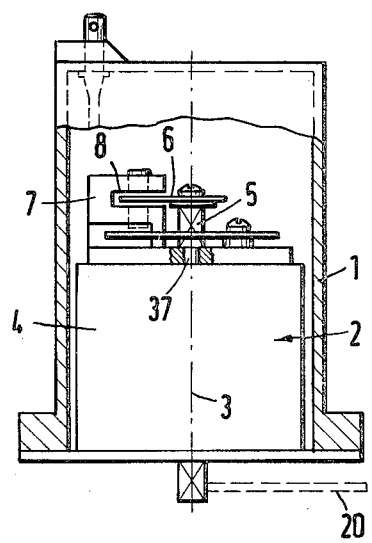

Referring to FIG. 1, the rotary controller includes a housing 1 in which is disposed a cam-operated switch which is generally identified by 2. An example for the arrangement of the cams and switch contacts of the controller is shown in FIG. 3. The camshaft of this cam-operated switch which is not shown in detail is rotatable about a pivot axis 3. This pivot axis 3 is rotatably mounted in bearing means of the housing 1. At the camshaft corresponding to the pivot axis 3 is arranged an actuating lever 20 which may be in the form of a pedal and allows continuous adjustment, optionally in opposition to the force of a spring not shown. A bottom housing 4 encloses the cam contacts and the camshaft. From this bottom housing 4 extends a portion 5 of the pivot axis 3. This portion 5 extends through a mask 6 which is shown in detail in FIG. 3. An extension, particularly a housing extension 7 is mounted on the bottom housing 4 and is arranged eccentrically of the pivot axis and includes an engagement slot 8 which opens toward this pivot axis. The mask 6 extends into this engagement slot. This mask which is rigidly but interchangeably mounted on the pivot axis 3 includes a slot 9 (FIG. 4) defining not only a controlling edge but likewise performing a predetermined control function by means of its width which varies along its length. FIG. 3 shows a simple embodiment wherein the slot tapers, concentrically of the pivot axis 3, from a wider end up to a tip portion whereby is provided an angular extension on the order of magnitude of about 50°. The concentric arrangement thereby depends upon the design of the cam-operated switches within the bottom housing 4. It may be seen, however, that by rotating the axis of the cam-operated switch there is automatically effected a variation of the control position in the opto-electronic arrangement which is disposed in the housing extension 7. In accordance with FIG. 2, a housing portion 10 is provided in this extension above the engagement slot 8. In this housing portion 10 is provided a light transmitter or emitter 11. Below the engagement slot 8 is provided a light receiver 13 in the housing portion 12. The light receiver 13 may consist of a phototransistor, and the light transmitter may suitably be a photodiode. The voltage delivered by the opto-electronic path is therefore dependent upon the characteristic of the controlling slot 9.

In FIG. 3 is shown in dashed lines the cam member 27 of the cam-operated switch 2 in a position concentrically of the pivot axis. The cam member may include a cam 28 for actuating a resiliently mounted switch contact 29 which is closed. In another plane may be arranged for example a cam 30 for a corresponding switch contact suspended by a spring 31 the cooperating contact of which is provided with respect to FIG. 3 underneath the cooperating contact 32 for the movable switch contact 29. These stationary contacts may be attached to the inner wall surface of the bottom housing 4, and it may be seen that there is possible a plurality of contact planes and contact arrangements. The cam body 27 is rigidly mounted on the pivot axis 3 and secured against rotation with respect to this pivot axis. The upwardly projecting end of the pivot axis may be of a rectangular cross-section, as indicated at 3', for admitting an interchangeable mounting of a mask 6 in a precisely defined rotational position. Likewise contemplated may be masks with larger rotary angles than the slot 9 or which may include multi-slot assemblies.

Figure 2:
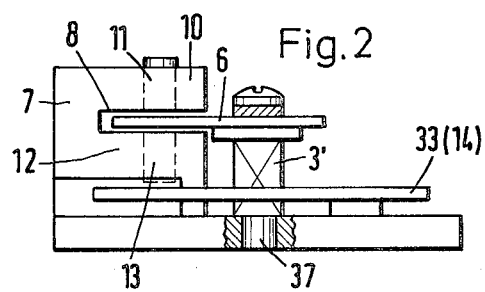
FIG. 2 is a fragmentary lateral elevational view in a larger scale with respect to FIG. 1.
Figure 3:
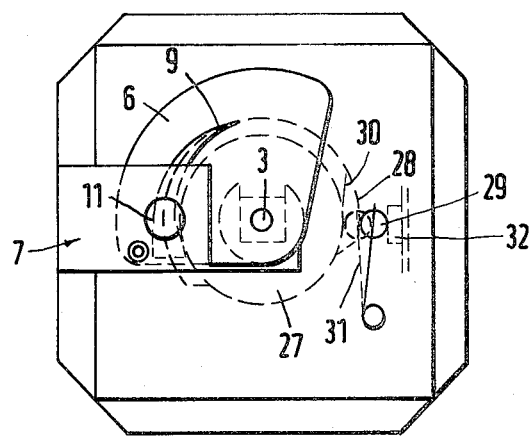
FIG. 3 is top view of FIG. 1, particularly for illustrating a mask.

The controller shown in FIGS. 1 and 2 includes an electronic circuit which may be arranged on a mounting plate 33. Similarly to the mask 6, the mounting plate is interchangeably attached. The design of this electronic circuit 14 is likewise shown in FIG. 4. The portion of the controller outside the circuit is identified as CO. The opto-electronic path is indicated by its transmitter 11 and receiver 13. This constitutes one input to the circuit. At 34 a power source is connected to the electronic circuit 14. The output is identified by 21. This circuit includes an operational amplifier 23 the reference point of which may be varied by a second input 15, as will be described further below. A component 24 serves as a uniform power supply for the circuit portion in which are arranged the light transmitter 11 and the light receiver 13 between which is movable the mask 6, in order to generate a predetermined set point characteristic at the output 21.

In the following is described the function of the second input with reference to the preferred application of a switch group in combination with a travel direction switch, although as explained above likewise other devices or apparatus intended to be controlled may be connected to the output 21.

In the described application, a different voltage may be applied to the second input 15, in dependence upon the position of the travel direction switch, in thereby varying the reference point for the operation amplifier 23. At this second input 15 may for example be provided a variable potentiometer 16 that by its other end is connected ground, and to which is normally connected across a switch 17. This switch is actuated for reversing the traveling direction in dependence upon the travel direction switch. The travel direction switch is indicated schematically in FIG. 4 by 19, together with the functional connection 18 thereof which may be an electronic connection. The switch 17 is normally closed. When throwing the travel direction switch into the other position, the switch 17 is opened, and the voltage at the second input 15 varies. This in dependence upon the initial position of the drive pedal, provides the required control action, so that the braking mode involves a braking operation in dependence upon the rotary angle of the controller, i.e. of the position of the actuating lever.

The set point required for braking is provided at the output 21. In dependence upon the position of the potentiometer 16 the voltage change to a different level at the output 21 influences the intensity of braking. Thereby, the control characteristic as introduced by the mask is retained, and the control range is changed.

Figure 5:
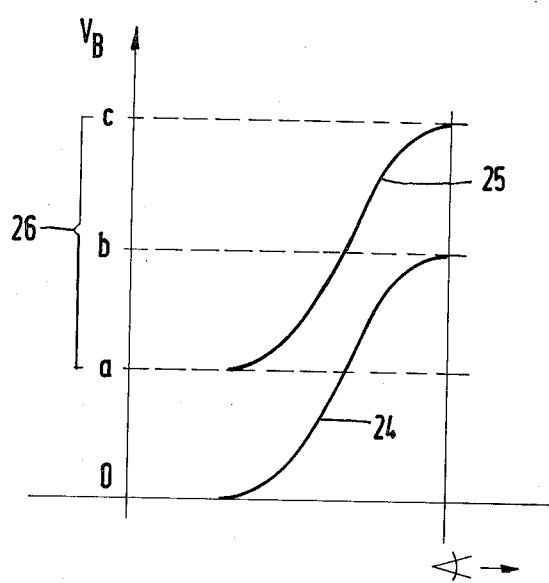
FIG. 5 is a diagram with characteristics for explaining the operation of the circuit of FIG. 4.

In FIG. 5 is shown as an example a characteristic of the set point at the output 21 vs. the motion, i.e. the angle of the controller position. The angular positions are marked along the abscissa axis. The ordinate axis indicates the voltage $V_B$. The characteristic 24 extends for example within a range of from 0 volts to b volts.

This condition applies for operation with the switch 17 closed. When for example applying a voltage to the second input 15 by opening this switch, optionally of the indicated proportion of about half the overall voltage, then in the type of control as described the output characteristic of the set point will be shifted into the range 26 between a and c volts corresponding to the characteristic 25. This type of shift is based upon the assumption that with respect to the characteristic the control is effected from the top toward the bottom, i.e. the point at b volts corresponds to the travel 0 and the point at o corresponds to full speed.

Figure 4:
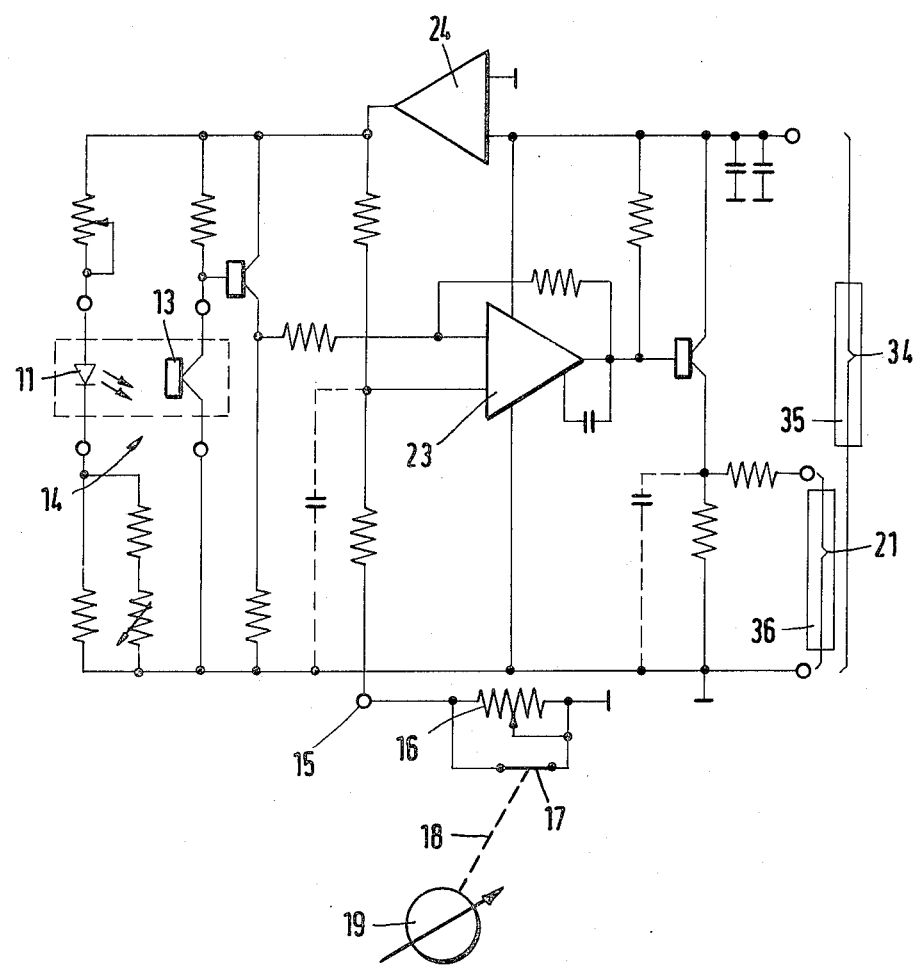
FIG. 4 is a schematic overall and circuit diagram of a vehicle incorporation the rotary controller of FIG. 1.

The voltage source provided at 34 is shown schematically in FIG. 4 by 35. This FIG. likewise illustrates the drive means 36 at the output 21. The drive means may preferably consist of the traveling drive of an electric vehicle the travel direction switch of which is for example indicated by 19, or consist of the hoisting drive for a load carrier in a vehicle. In another embodiment, 19 is a slow-speed travel switch in combination with a traveling drive which is controlled by 11, 13, as shown with respect to FIGS. 1 to 3. In these FIGS. the bearing means 37 for the pivot axis 3 are indicated in wall members of the housing 1.

The entire system is mounted on a vehicle VE with a travel drive TD, hoist drive HD, each powerable by the drive means, or motor means 36.

We claim:

1. A controller comprising: a first movable actuating member, a control member movable by said actuating member, sensing means sensibly coupleable to said control member for producing signals in response to the position of the control member, a circuit having a first input coupled to said sensing means, said control member defining a specific characteristic having a given form and slope configuration representing a specific variation of one variable relative to a variation in another variable, said sensing means being arranged for producing an output corresponding to the characteristic when the control member is moved by the actuating member through a given range, said circuit having an output for producing an output signal corresponding to the characteristic and its variables including the form and slope configuration when the control member is moved by the actuating member through the range, said circuit having a reference value forming portion for forming a reference value and a second input connected to the reference value forming portion, variable second input means for applying a second signal to said second input, said second input means being adjustable independent of said circuit for varying the reference value, said second input means having circuit means for shifting the signal at the output to a different level but with the same form and slope configuration of the signal so that in the output signal the absolute value of the one variable changes without changing the variation of the one variable relative to the variation of the other variable.

2. A controller as in claim 1, wherein said circuit means includes an operational amplifier having a first terminal coupled to the first input and a second terminal coupled to the second input, and wherein said circuit produces the output signal as a first voltage, and wherein said circuit means adds a second constant voltage to the first voltage for shifting the signal.

3. An electric vehicle, comprising motor means, a movable actuating member, a control member movable by said actuating member, sensing means sensibly coupleable to said control member for producing signals in response to the position of the control means, said control member defining a specific characteristic having a given form and slope configuration representing a specific variation of one variable relative to a variation in another variable, said sensing means being arranged for producing an output corresponding to the characteristic when the control member is moved by the actuating member through a given range, a circuit having a first input coupled to the sensing means, said circuit having a signal path for producing an output signal corresponding to the characteristic including the form and slope configuration when the control member is moved by the actuating member through the range, reference means in said circuit for establishing a reference value, said circuit having a second input at said reference means, variable second input means for applying a second signal to said second input means, said circuit having circuit means for shifting the characteristic at the output to a different level but with the same form and configuration of the characteristic so that in the output signal the absolute value of the one variable changes without changing the variation of the one variable relative to the variation of the other variable, and actuating means for shifting the second signal of said second input means.

4. A vehicle as in claim 3, wherein said circuit means includes an operational amplifer having a first terminal coupled to the first input and a second terminal coupled to the second input.

5. A controller as in claims 1 or 3, wherein the characteristic has the form $y = F(x) + K$ where x is the one variable and y the other variable and K is a value independent of x, and wherein said circuit means in said second input means is arranged for changing the value of K without affecting $F(x)$, and a second actuating member independent of the first actuating member for changing the value K.

6. A controller as in claims 1, 2, 3, or 4, wherein said circuit means in said second input means include a potentiometer for varying the second input.

7. A controller as in claim 6, wherein said circuit means in said second input means is a potentiometer.

8. A controller as in claim 6, wherein said circuit means in said second input means includes a switch across said potentiometer.

9. A controller as in claim 7, wherein said circuit means in said second input means includes a switch across said potentiometer.

10. A controller comprising a movable member, a mask having an edge of predetermined shape, a sensor, a circuit having two inputs and an output, a variable control for producing a plurality of signals, and means mechanically coupling the movement of the movable member with the mask so that said edge moves near said sensor and electrically coupling the sensor to one of the inputs and the variable control to the other input for causing said output to exhibit output values corresponding to the shape of the mask relative to a first direct electrical value when the variable control produces one signal, and for causing said output to produce the same output values corresponding to the shape of the mask relative to a second direct electrical value when the variable control produces other signals.

* * * * *